(12) United States Patent
Sjogren et al.

(10) Patent No.: US 7,407,348 B2
(45) Date of Patent: Aug. 5, 2008

(54) INDEXABLE CUTTING INSERTS AND METHODS FOR PRODUCING THE SAME

(75) Inventors: Clas Sjogren, Solihull (GB); Mikael Lindholm, Varby (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/142,191

(22) Filed: Jun. 2, 2005

(65) Prior Publication Data
US 2006/0147280 A1 Jul. 6, 2006

Related U.S. Application Data

(63) Continuation-in-part of application No. 10/857,922, filed on Jun. 2, 2004, now abandoned.

(51) Int. Cl.
*B23B 27/16* (2006.01)
(52) U.S. Cl. ............... 407/119; 407/118; 407/113; 407/48
(58) Field of Classification Search ............... 407/48, 407/103, 113, 115, 116, 118, 119
See application file for complete search history.

(56) References Cited

U.S. PATENT DOCUMENTS

| | | | |
|---|---|---|---|
| 2,475,565 A | 7/1949 | Houchins | |
| 3,694,876 A * | 10/1972 | Erkfritz | 407/48 |
| 4,200,159 A | 4/1980 | Peschel et al. | |
| 4,378,184 A | 3/1983 | Briese | |
| 4,437,800 A | 3/1984 | Araki et al. | |
| 4,448,591 A | 5/1984 | Ohno | |
| 4,507,023 A | 3/1985 | Shikata | |
| 4,636,116 A | 1/1987 | Shikata | |
| 4,714,385 A | 12/1987 | Komanduri | |
| 4,866,885 A | 9/1989 | Dodsworth | |
| 4,991,467 A | 2/1991 | Packer | |
| 5,115,697 A | 5/1992 | Rodriguez et al. | |
| 5,147,158 A | 9/1992 | Riviere | |
| 5,183,362 A | 2/1993 | Kuroyama et al. | |
| 5,193,948 A | 3/1993 | Noggle | |
| 5,536,119 A | 7/1996 | Werner et al. | |
| 5,569,000 A | 10/1996 | Littecke et al. | |
| 5,598,621 A | 2/1997 | Littecke et al. | |
| 5,676,496 A | 10/1997 | Littecke et al. | |
| 5,707,185 A * | 1/1998 | Mizutani | 407/42 |
| 5,712,030 A | 1/1998 | Goto et al. | |
| 5,827,016 A * | 10/1998 | Strand | 407/115 |
| 5,846,032 A | 12/1998 | Murakami | |

(Continued)

FOREIGN PATENT DOCUMENTS

EP 0 596 742 5/1994

(Continued)

*Primary Examiner*—Boyer D. Ashley
*Assistant Examiner*—Sara Addisu
(74) *Attorney, Agent, or Firm*—Drinker Biddle & Reath LLP

(57) ABSTRACT

A cutting insert has a body formed of a superhard material or a superhard material and a cemented carbide, and has a hole through said body and a preformed hole inlay in said hole to allow securing of the insert to a holder. The method of making same is also disclosed.

20 Claims, 7 Drawing Sheets

U.S. PATENT DOCUMENTS

| | | |
|---|---|---|
| 5,984,593 A | 11/1999 | Bryant |
| 6,053,671 A * | 4/2000 | Stedt et al. ............... 407/35 |
| 6,099,209 A | 8/2000 | Murray et al. |
| 6,120,570 A | 9/2000 | Packer et al. |
| 6,155,755 A | 12/2000 | Kanada et al. |
| 6,161,990 A | 12/2000 | Oles et al. |
| 6,191,990 B1 | 2/2001 | Itoh et al. |
| 6,286,406 B1 | 9/2001 | Viswanadham et al. |
| 6,508,612 B1 * | 1/2003 | Baca ....................... 407/43 |
| 6,540,450 B2 | 4/2003 | Gatton et al. |
| 6,543,970 B1 | 4/2003 | Qvarth et al. |
| 6,655,881 B2 | 12/2003 | Shimizu |
| 6,709,205 B2 * | 3/2004 | Morgulis et al. ........... 407/113 |
| 6,796,750 B2 * | 9/2004 | Men ....................... 407/35 |
| 7,008,145 B2 * | 3/2006 | Astrakhan ................. 407/35 |
| 2002/0002886 A1 * | 1/2002 | Hansson et al. ............ 82/161 |
| 2002/0112408 A1 | 8/2002 | Rolander |
| 2004/0228694 A1 | 11/2004 | Webb et al. |
| 2004/0234349 A1 | 11/2004 | Ueda et al. |
| 2004/0258491 A1 | 12/2004 | Penkert |
| 2005/0152804 A1 | 7/2005 | Sjogren et al. |
| 2005/0183893 A1 | 8/2005 | Sjogren |
| 2005/0232712 A1 * | 10/2005 | Hecht ..................... 407/110 |

FOREIGN PATENT DOCUMENTS

| | | |
|---|---|---|
| EP | 1 435 270 A1 | 7/2004 |
| FR | 2 691 657 | 12/1993 |
| FR | 2 706 339 | 12/1994 |
| JP | 59016911 | 1/1984 |
| WO | 97/29885 | 8/1997 |
| WO | WO 03/015967 | 2/2003 |

* cited by examiner

INDEXABLE CUTTING INSERTS AND METHODS FOR PRODUCING THE SAME

CROSS-REFERENCE TO RELATED APPLICATION

The present application is a continuation-in-part of pending application Ser. No. 10/857,922 filed Jun. 2, 2004.

BACKGROUND OF THE INVENTION

The present invention relates to cutting inserts having cutting edges formed from a superhard abrasive material, and methods of making the same.

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

Indexable cutting inserts using a superhard material for cutting typically have a polygonal shape with the superhard material disposed at the corners of the polygon. The superhard material, often a cubic boron nitride or polycrystalline diamond material, aids in the cutting of hard workpiece materials such as metals. These cutting inserts are typically mounted in a fixed position to a cutting tool so as to present one of the corners or areas containing superhard material to the surface of a workpiece. After being used for a period of time, the area of superhard material becomes worn. The cutting insert can then be unfastened from the cutting tool and rotated so as to present a new fresh corner or area of superhard material to the surface of the workpiece.

There are two predominant ways of making such inserts. According to one technique, a stacked structure is formed comprising a first layer of hard backing material and a layer of superhard cutting material superimposed onto the backing layer. Cutting tips are then cut from this stacked structure and brazed to a cutting insert body, typically at a corner thereof. U.S. Pat. No. 5,183,362 to Kuroyama et al., the disclosure of which is incorporated herein by reference, in its entirety, describes such a technique.

A second technique for forming indexable cutting inserts involves providing a blank or substrate having pockets formed therein which are filled with superhard material, then subjecting the blank to a sintering operation which bonds the superhard material to the substrate. The blank is then subsequently machined to give the cutting insert its final shape, i.e.—a generally polygonal body with superhard material disposed at the corners thereof. U.S. Pat. No. 5,676,496, the disclosure of which is incorporated herein by reference, in its entirety, describes such a technique.

In general, such superhard material-containing inserts have been held in place by an external (e.g., top) clamp. See, for example, FIG. 25 of U.S. Pat. No. 5,183,362 which shows a top clamp with a preformed, separate chip breaker. Another type of clamping used with other types of cutting inserts involves the use of a screw which passes through a hole in the insert, often in the center of the insert. Such holes may be straight or involve an offset portion to assist in securing the insert. See, for example, U.S. Pat. No. 5,147,158 which discloses in cross-section a "trumpet" style of clamping hole for securing purposes. Laser cutting or EDM (electro-discharge machining) is used to cut the superhard material and it can be appreciated that machining of a "trumpet" style hole in the superhard material is quite difficult and expensive to do. In addition, the accuracy of such cuts is problematic.

In U.S. Pat. No. 6,120,570, there is a disclosed a method of making a cutting insert of a superhard material which is sintered onto a cemented carbide base by high pressure and temperature. A hole is simultaneously formed in the insert through the use of a plug, preferably made of the same cemented carbide as the base, which is not bonded to the insert but is removed after sintering. In FIG. 3 of U.S. Pat. No. 6,120,570, the hole is shown to be tapered towards the bottom of the insert.

U.S. Pat. No. 5,536,119 shows a conventional cutting insert in which a through hole has an upper part which is substantially cylindrical while the remaining part tapers downwardly in the form of a convexly vaulted surface.

Thus, a need exists in the art to address the problems discussed above and others.

SUMMARY OF THE INVENTION

The present invention provides devices and methods that address the above-mentioned problems, and others.

The present invention provides improved indexable cutting inserts and improved methods of producing the same.

According to one aspect of the present invention there is provided a cutting insert comprising a base portion of a superhard material or a superhard material attached to a cemented carbide with a hole for clamping said insert wherein said hole is formed in an inlay attached to said base portion.

In another embodiment, there is provided a method of making a cutting insert comprising:

forming a layer of superhard material;

attaching said layer onto a superhard material or a cemented carbide substrate;

forming a hole through said layers; and attaching a preformed hole inlay within said hole.

BRIEF DESCRIPTION OF THE DRAWING FIGURES

FIGS. 5A-D are side views of another embodiment according to the principles of the present invention.

Figure 6A:
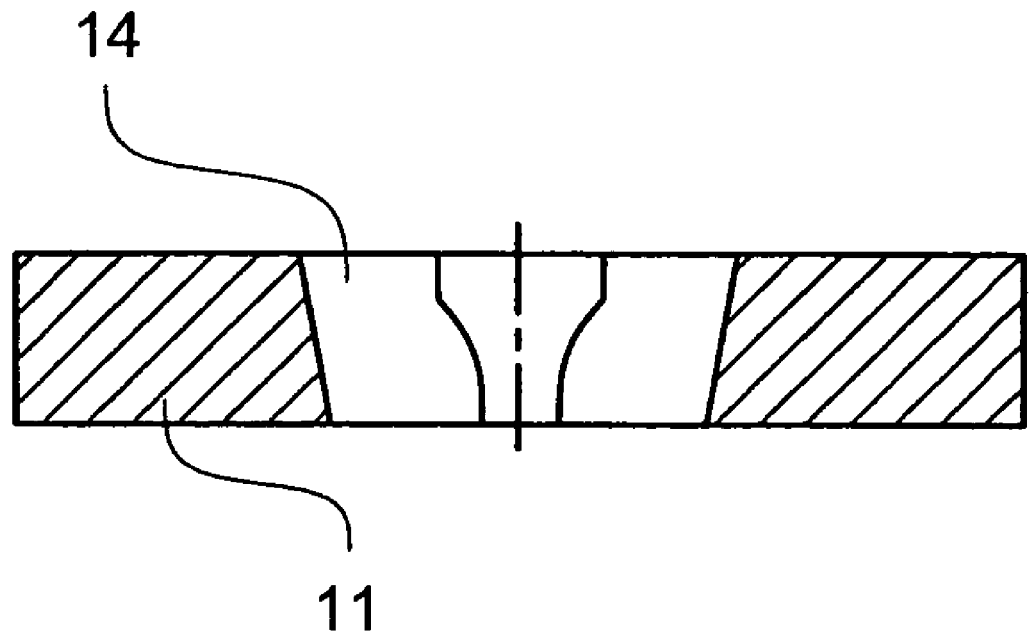
Figure 6B:
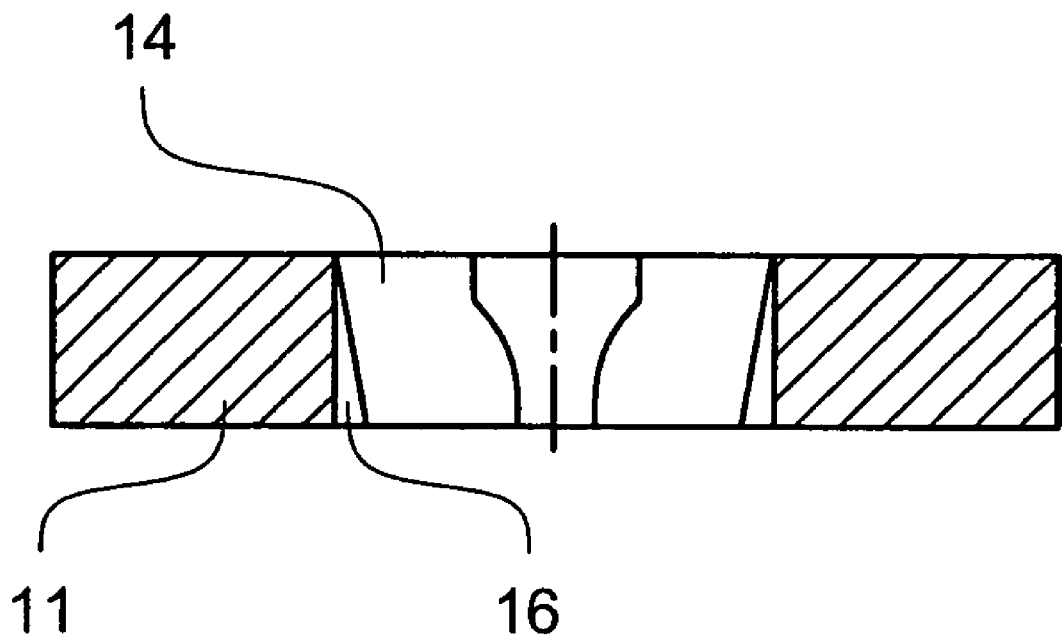

FIGS. 6A and 6B are side views of still another embodiment according to the principles of the present invention.

DETAILED DESCRIPTION OF THE INVENTION

Exemplary arrangements and techniques according to the present invention will now be described by reference to the drawing figures.

According to the present invention, a blank is formed from a superhard cutting material. The blank can also be formed from at least one hard material and at least one superhard cutting material. An illustrative embodiment of such a latter blank is shown in FIGS. 1A, 1B, 2A and 2B. As shown therein, the blank 10 comprises a top layer or portion 11 of a superhard material and a bottom layer or portion 12 of a hard material. While the blank 10 is illustrated as having a polygonal-like shape, other geometries are clearly possible, such as circular.

Generally, the superhard cutting material and the hard material are sintered together using conventional high-pressure and high-temperature techniques to form a solid body in disc form. Such techniques are conventional and are disclosed, for example, in U.S. Pat. No. 5,676,496. When made only of a superhard material, the body can be formed in one step. Examples of other suitable processes are described, for example, in U.S. Pat. Nos. 4,991,467 and 5,115,697, the disclosures of which are herein incorporated by reference in their entirety. The particular form of the blank can then be cut, e.g., by electro-discharge machining (EDM) from the disc. At least one blank hole 13 may be formed during the pressing and sintering but is preferably machined after processing. The inner wall of the blank hole in the top portion and bottom portion of the blank form an interface 17.

Figure 2A:
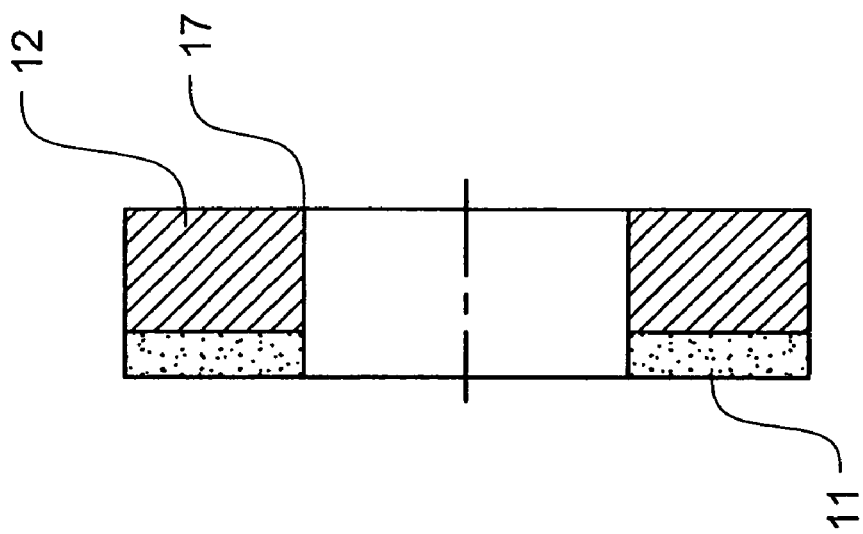
FIG. 2A is a side view of the blank and FIG. 2B of the finished cutting insert of FIG. 1.
Figure 1A:
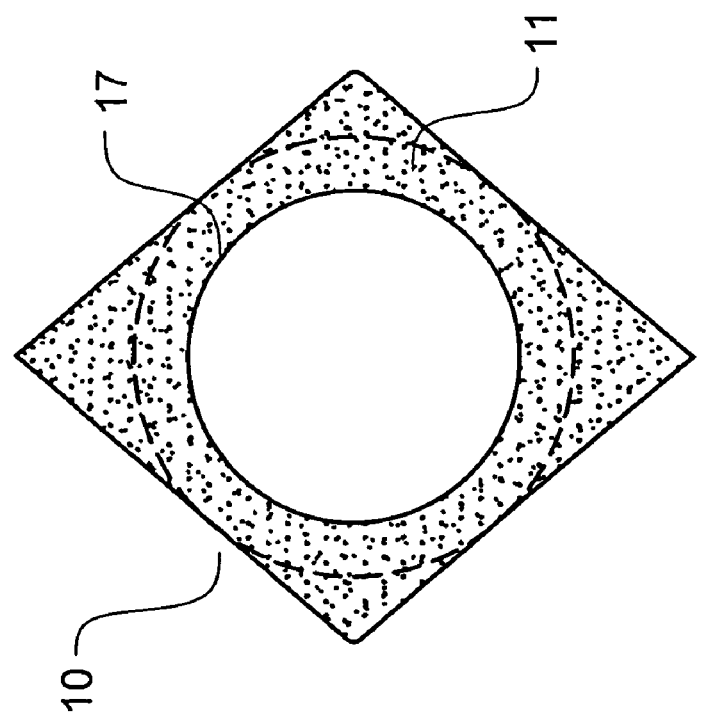
FIG. 1A is a top view of a blank and FIG. 1B a finished cutting insert constructed according to the principles of the present invention.
Figure 2B:
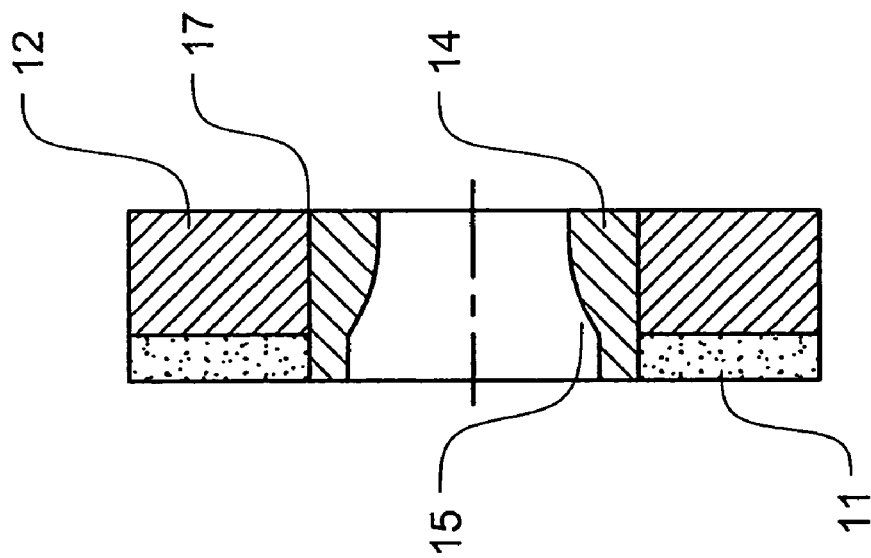
Figure 1B:
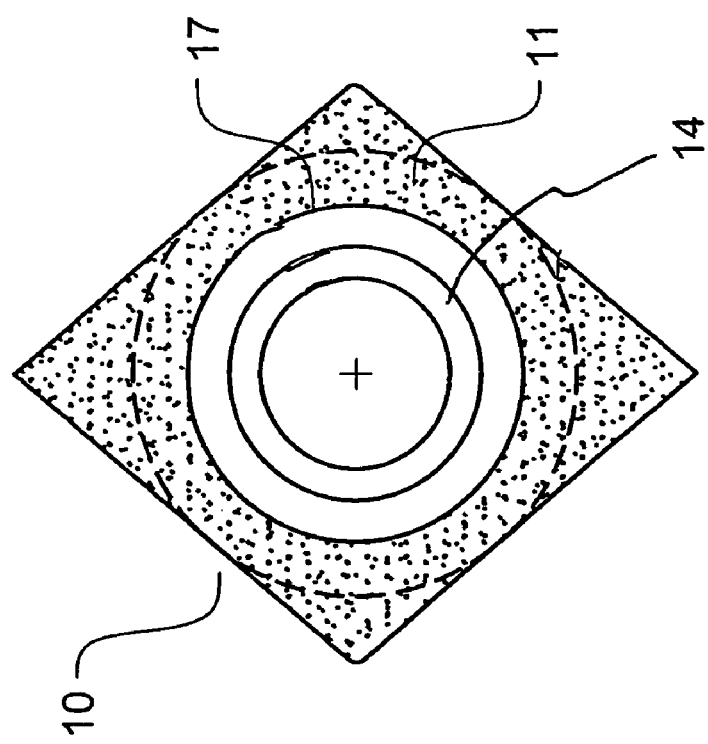
Figure 3F:
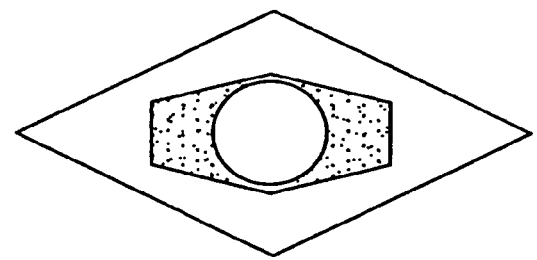
FIGS. 3A-3F are top views of other embodiments according to the principles of the present invention.
Figure 3C:
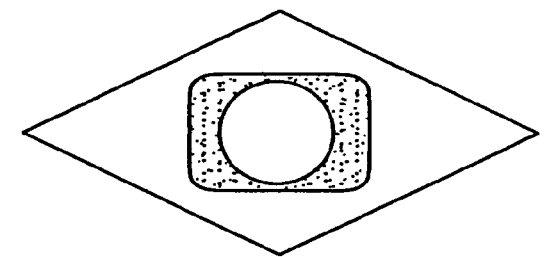
Figure 3E:
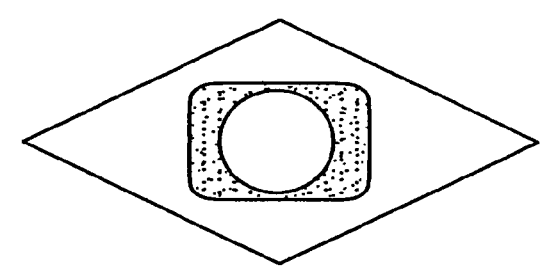
Figure 3B:
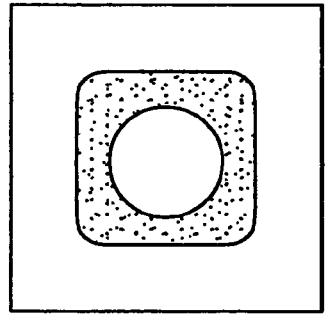
Figure 3D:
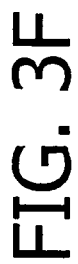
Figure 3A:
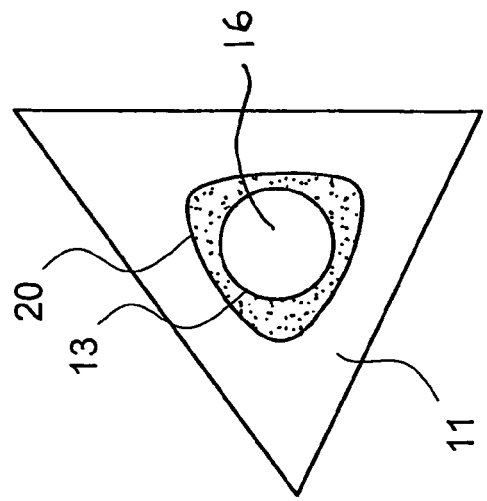

In the embodiment of FIGS. 1B and 2B, the shape of the blank hole is defined by a preformed hole inlay 14 which is mounted, preferably attached and most preferably brazed, into place in the blank hole 13 within the interface in the insert. It will be appreciated that this hole inlay 14 can be preformed into any particular shape necessary for the ultimate mounting. By preforming the hole inlay 14 by any appropriate technique for the chosen material, for example, by pressing a sintering a cemented carbide, various shapes can be accurately and relatively easily made. The hole inlay 14 may be made of any suitable material such as steel, a powder metallurgically formed steel, etc., but is preferably made of a cemented carbide. Most preferably, the cemented carbide of hole inlay 14 is the same as that of layer 12. If desired, a chip breaking geometry may be formed (e.g., by EDM) on the appropriate surfaces of the superhard layer.

It will be appreciated that the blank hole 13 should extend through the entire body but the hole inlay 14 does not necessarily extend through the entire body so long as the hole inlay 14 provides the required mounting support for the mounting means (not shown) when the insert is mounted in the tool holder. For example, when the cutting insert is double sided (e.g., as in FIG. 9), two hole inlays may be used to form the appropriate mounting supports. In addition, there may be multiple hole inlays, some of which do not extend all the way through the body.

As shown in FIG. 2, the hole inlay 14 is preferably preformed into a shape in which the inner walls 15 converge in a generally conical manner from the top of the superhard layer 11 towards the bottom of the hard material 12. Such a design assists in securing the screw (not shown) firmly within the clamping hole when attaching the insert to the holder. It will be appreciated that the clamping hole has a design appropriate for also other clamping systems, for example, a cylindrical clamping hole.

FIG. 3 shows other variants in which the shape of the hole inlay is other than round as in FIGS. 1A and 2A. These variations are shown as FIGS. 3A-3F. In FIGS. 3A-3F, the cutting inserts are shown from the top with the top layer of superhard material 11 and hole inlay 14 visible. It will be understood by the skilled artisan that other shapes may also be utilized, if desired. In all shown cases, the clamping hole 16 is round and generally conical but other shapes are possible.

Figure 4A:
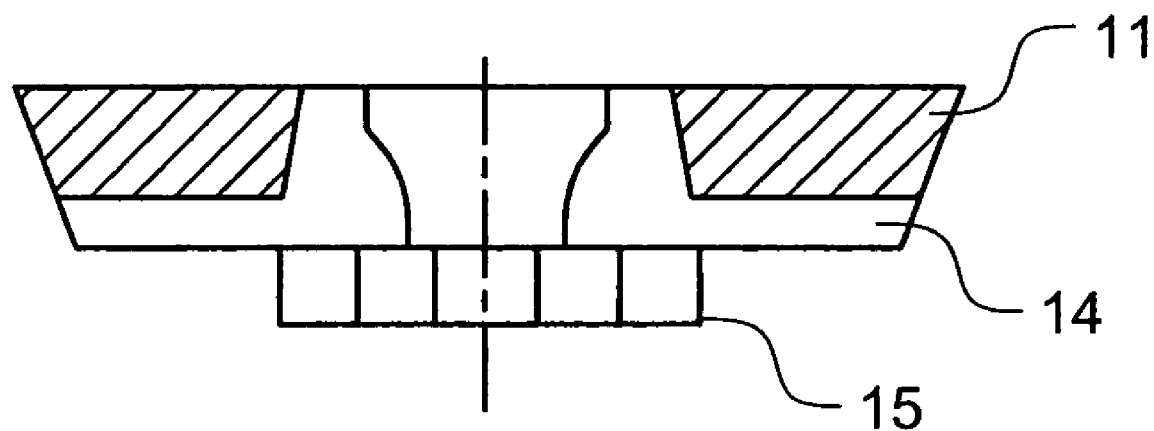
FIGS. 4A, 4B and 4C are side views of another embodiment according to the principles of the present invention.
Figure 4B:
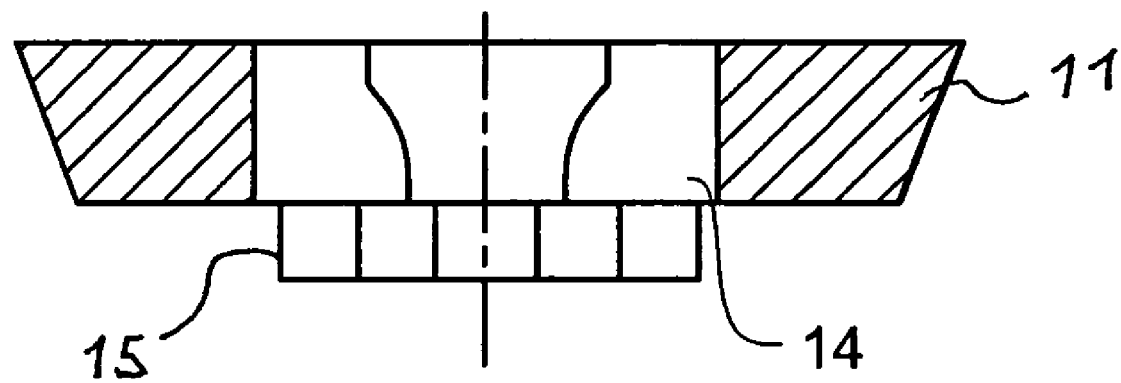
Figure 4C:
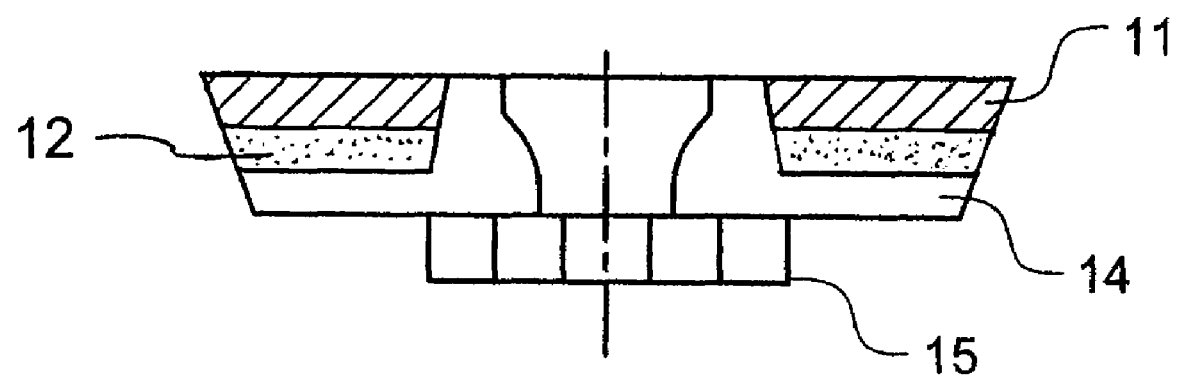

FIGS. 4A and 4B show other embodiments of the invention in which the hole inlay 14 has a length such that it extends below from the bottom plane of the insert. In this case, the insert is a single-sided insert. As shown, this bottom portion 15 has a form, preferably a non-circular form, which corresponds to a cavity in the tool holder (not shown) and serves to secure the insert more firmly in the tool holder. Although not shown, it will be understood that the clamping hole can extend through the bottom portion 15. FIG. 4A illustrates an embodiment where the superhard layer 11 is present only in an upper portion of the insert where 14 represents the inlay while FIG. 4B illustrates an insert in which the super hard layer extends from the top to the bottom of the insert. FIG. 4C shows another version of the FIG. 4A embodiment, but also including a top layer or portion 11 of a superhard material and a bottom layer or portion 12 of a hard material, similar to that shown in side view in FIGS. 2A and 2B.

Figure 5A:
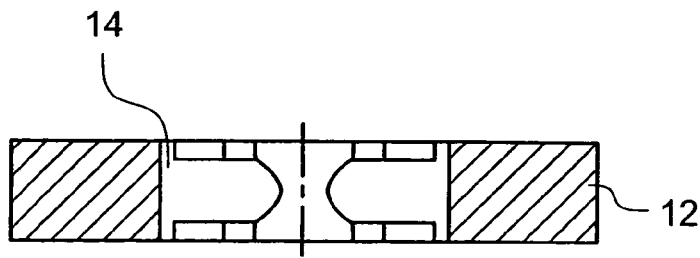
Figure 5B:
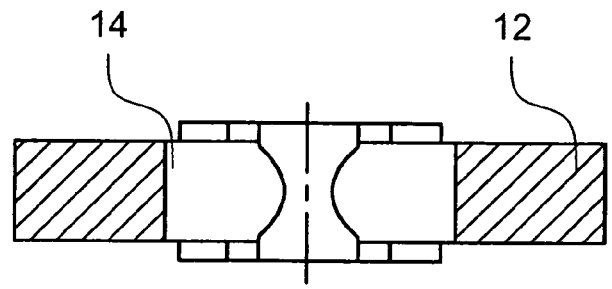
Figure 5C:
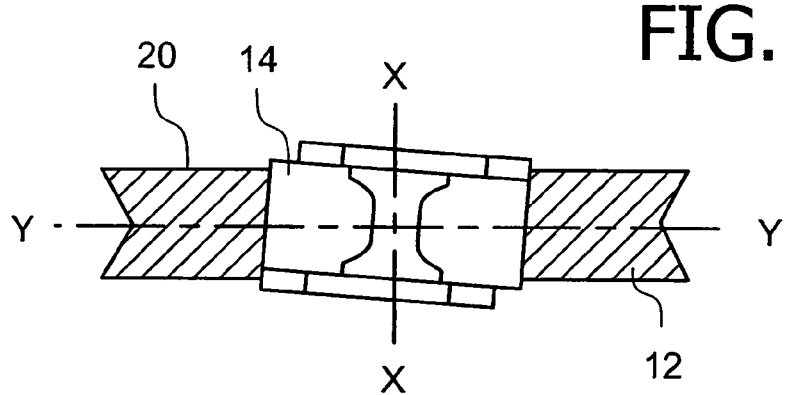
Figure 5D:
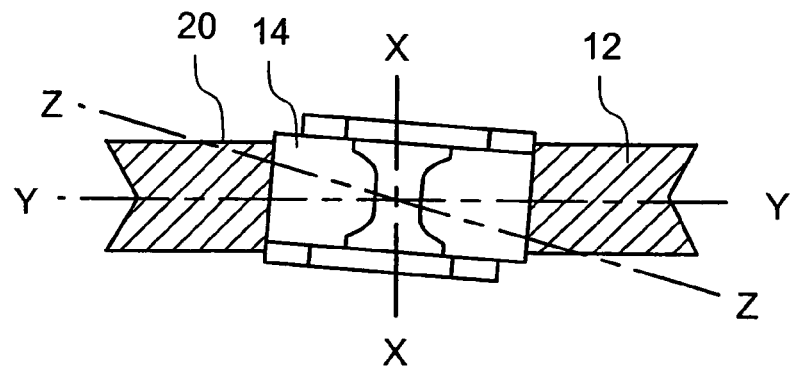

FIGS. 5A and 5B illustrate a double-sided insert in which in the length of the hole inlay 14 is such it extends beyond the top and bottom planes of the insert (FIG. 5B) or is formed in the top and bottom planes (FIG. 5A). FIG. 5C shows an insert in which the axis x-x of the blank hole 13 is not perpendicular to the plane axis y-y of the cutting insert 20. If desired, the axis x-x of the blank hole 13 may not be parallel to the axis z-z of the clamping hole inlay 14 (FIG. 5D). The cavity in the hole inlay should correspond to the protruding part of the tool holder (FIG. 5A) and vice versa (FIG. 5B) and may, if desired, be formed from at least two preformed sections (not shown).

FIG. 6 shows an embodiment of the present invention in which the outer walls of the hole inlay 14 is formed preferably in a conical shape with corresponding conical-shaped walls in the blank hole or through the whole body In FIG. 6A, the walls of the hole inlay 14 and the blank hole are flush. In FIG. 6B, the walls of the hole inlay 14 and the blank hole have different conocity whereby either one or both of the walls can be cylindrical.

The hard material of 12 is formed from any suitable hard material. Examples of suitable materials include cemented carbides, cermets, and hard metal alloys. One suitable composition is a WC-Co cemented carbide having 6 to 20 weight % Co. Various preferred embodiments may contain 9 to 11 weight % Co or 15 to 17 weight % Co.

The superhard material of 11 can comprise any suitable material chosen for its cutting characteristics. For example, it may comprise a polycrystalline cubic boron nitride (PCBN), a polycrystalline diamond material (PCD) or a ceramic based on silicon nitride and/or alumina. The superhard material may also have additions of other materials, such as carbides, nitrides, carbonitrides, oxides, and/or borides of metals chosen from groups IVa to VIa of the periodic table.

The described embodiments of the present invention are intended to be illustrative rather than restrictive, and are not intended to represent every possible embodiment of the present invention. Various modifications can be made to the disclosed embodiments without departing form the spirit or scope of the invention as set forth in the following claims, both literally and in equivalents recognized by law.

What is claimed is:

1. A cutting insert comprising:
  a base portion of a superhard material or a superhard material attached to a cemented carbide, the base portion having a first hole therethrough extending from a first surface of the base portion to a second surface of the base portion; and
  an inlay of a hard material attached to said base portion, said inlay having a projecting portion inserted into the first hole, a planar portion covering the second surface of the base portion, a bottom portion extending from the planar portion below a bottom plane of the insert and a second hole extending from a first surface of the projecting portion to a second surface of the bottom portion, wherein inner surfaces of the first hole have portions that are one of cylindrical or conical, and wherein inner surfaces of the second hole are generally conical.

2. The cutting insert of claim 1 wherein said base portion includes a cemented carbide and said layer of superhard material is attached to said cemented carbide by sintering.

3. The cutting insert of claim 2 wherein said inlay is attached to said base portion by brazing.

4. The cutting insert of claim 1 wherein said inlay is comprised of a cemented carbide.

5. The cutting insert of claim 1 wherein said superhard material is cubic boron nitride or polycrystalline diamond.

6. The cutting insert of claim 1 wherein said superhard layer includes a chip breaker portion.

7. The cutting insert of claim 1 wherein said bottom portion is shaped to fit into a correspondingly shaped portion in a tool holder for said insert.

8. The cutting insert of claim 1 wherein the central axis of said insert is not perpendicular to the axis of the insert.

9. The cutting insert of claim 1 wherein the second hole is a clamping hole and wherein the central axis of said inlay is not perpendicular to the axis of the clamping hole.

10. The cutting insert of claim 1 wherein the planar portion is radially coextensive with the second surface of the base portion.

11. A method for making a cutting insert comprising:
    forming a layer of superhard material;
    optionally attaching said layer onto a superhard material or a cemented carbide substrate;
    forming a first hole through said layers; and
    attaching a preformed hole inlay within said first hole,
    wherein said hole inlay includes a projecting portion inserted into the first hole, a planar portion covering the second surface of the layers, a bottom portion extending from the planar portion below a bottom plane of the insert and a second hole extending from a first surface of the projecting portion to a second surface of the bottom portion,
    wherein inner surfaces of the first hole have portions that are one of cylindrical or conical, and
    wherein inner surfaces of the second hole are generally conical.

12. The method of claim 11 wherein said substrate is a cemented carbide and said layer is attached to said substrate by sintering.

13. The method of claim 11 wherein said preformed hole inlay is attached by brazing.

14. The method of claim 11 wherein said layer and said substrate are both made of a superhard material.

15. The method of claim 11 wherein said bottom portion is shaped to fit into a correspondingly shaped cavity in a tool holder for said insert.

16. The method of claim 11 wherein the planar portion is radially coextensive with the second surface of the base portion.

17. A cutting insert comprising:
    a base portion having a first hole therethrough extending from a first surface of the base portion to a second surface of the base portion; and
    an inlay attached to said base portion,
    wherein the inlay includes a first side, a second side and a second hole,
    wherein the inlay has a projecting portion on the first side that is inserted into the first hole and extending to the first surface of the base portion, a planar portion on the second side covering the second surface of the base portion, and a bottom portion on the second side extending from the planar portion below a bottom plane of the insert,
    wherein the second hole extends through the inlay from a first, axial distal-most surface of the projecting portion to a second, axial distal-most surface of the bottom portion,
    wherein inner surfaces of the first hole have portions that are one of cylindrical or conical and inner surfaces of the second hole are generally conical, and
    wherein the base portion is formed of a superhard material or a superhard material attached to a cemented carbide and the inlay is formed of a hard material.

18. The cutting insert of claim 17 wherein the planar portion is radially coextensive with the second surface of the base portion.

19. The cutting insert of claim 17 wherein a central axis of said insert is not perpendicular to an axis of the insert.

20. The cutting insert of claim 17 wherein the second hole is a clamping hole and wherein a central axis of said inlay is not perpendicular to an axis of the clamping hole.

* * * * *